US011642821B2

United States Patent
Lawless, III et al.

(10) Patent No.: US 11,642,821 B2
(45) Date of Patent: \*May 9, 2023

(54) EXPANDING CROSSLINKING POLYMER INJECTION MOLDING SYSTEM

(71) Applicant: IMFLUX INC., Hamilton, OH (US)

(72) Inventors: William Francis Lawless, III, Medford, MA (US); Rick Alan Pollard, Moscow, OH (US); Gene Michael Altonen, West Chester, OH (US); Chow-Chi Huang, West Chester, OH (US)

(73) Assignee: IMFLUX INC., Hamilton, OH (US)

( \* ) Notice: Subject to any disclaimer, the term of this patent is extended or adjusted under 35 U.S.C. 154(b) by 190 days.

This patent is subject to a terminal disclaimer.

(21) Appl. No.: 17/321,908

(22) Filed: May 17, 2021

(65) Prior Publication Data

US 2021/0268705 A1 Sep. 2, 2021

Related U.S. Application Data

(62) Division of application No. 15/992,855, filed on May 30, 2018, now Pat. No. 11,040,472.

(Continued)

(51) Int. Cl.
*B29C 45/76* (2006.01)
*B29C 45/00* (2006.01)
(Continued)

(52) U.S. Cl.
CPC ........ *B29C 45/762* (2013.01); *B29C 45/0001* (2013.01); *B29C 45/766* (2013.01);
(Continued)

(58) Field of Classification Search
None
See application file for complete search history.

(56) References Cited

U.S. PATENT DOCUMENTS 4,208,176 A 6/1980 Salerno
4,236,181 A 11/1980 Shibata et al.
(Continued)

FOREIGN PATENT DOCUMENTS

DE 3738248 A1 4/1988
DE 4140392 A1 6/1993
(Continued)

OTHER PUBLICATIONS

International Search Report and Written Opinion for Application No. PCT/US2018/035079 dated Jul. 27, 2018.
(Continued)

*Primary Examiner* — Benjamin A Schiffman
(74) *Attorney, Agent, or Firm* — Marshall, Gerstein & Borun LLP

(57) ABSTRACT

Non-time dependent calculated variables based on measured strain are used to effectively determine an optimal hold profile for an expanding crosslinking polymer part in a mold cavity. A system and/or approach may first inject molten expanding crosslinking polymer into a mold cavity, then measure strain at the mold cavity or at another location within the injection molding system, and then calculate at least one non-time dependent variable during an injection molding cycle. Next, the system and/or method commences a hold profile for the part, and upon completing the hold profile, the part is ejected from the mold cavity, whereupon a cure profile is commenced.

6 Claims, 3 Drawing Sheets

Related U.S. Application Data

(60) Provisional application No. 62/523,067, filed on Jun. 21, 2017.

(51) Int. Cl.
  *B29C 45/77* (2006.01)
  *B29K 105/24* (2006.01)
  *B29K 23/00* (2006.01)
  *B29K 105/04* (2006.01)

(52) U.S. Cl.
  CPC .......... *B29C 45/7626* (2013.01); *B29C 45/77* (2013.01); *B29C 2945/76006* (2013.01); *B29C 2945/76257* (2013.01); *B29C 2945/76287* (2013.01); *B29C 2945/76384* (2013.01); *B29C 2945/76414* (2013.01); *B29C 2945/76481* (2013.01); *B29C 2945/76561* (2013.01); *B29C 2945/76622* (2013.01); *B29C 2945/76735* (2013.01); *B29C 2945/76862* (2013.01); *B29C 2945/76882* (2013.01); *B29C 2945/76886* (2013.01); *B29C 2945/76896* (2013.01); *B29C 2945/76933* (2013.01); *B29C 2945/76943* (2013.01); *B29K 2023/083* (2013.01); *B29K 2105/04* (2013.01); *B29K 2105/24* (2013.01)

(56) References Cited

U.S. PATENT DOCUMENTS

| | | | |
|---|---|---|---|
| 4,411,609 | A | 10/1983 | Yoshii et al. |
| 4,767,579 | A | 8/1988 | Buja et al. |
| 5,384,079 | A | 1/1995 | Bur et al. |
| 5,447,425 | A | 9/1995 | Hsu et al. |
| 5,519,211 | A | 5/1996 | Bur et al. |
| 5,566,743 | A | 10/1996 | Guergov |
| 6,500,368 | B1 | 12/2002 | Sameshima et al. |
| 8,641,943 | B1 | 2/2014 | Kipe et al. |
| 9,604,398 | B2 | 3/2017 | Altonen et al. |
| 10,953,583 | B2* | 3/2021 | Montague, II ........... B29C 44/42 |
| 11,040,472 | B2* | 6/2021 | Lawless, III ........... B29C 45/762 |
| 11,072,102 | B2* | 7/2021 | Unkovic ................. B29C 45/78 |
| 11,161,286 | B2* | 11/2021 | Montague, II ........... B29C 44/60 |
| 2005/0240303 | A1 | 10/2005 | Smith |
| 2009/0315205 | A1 | 12/2009 | Koumaru |
| 2011/0101555 | A1 | 5/2011 | Kazmer et al. |
| 2012/0231103 | A1* | 9/2012 | Catoen ................... B29C 45/17 425/150 |
| 2014/0127338 | A1 | 5/2014 | Altonen et al. |
| 2015/0035189 | A1 | 2/2015 | Altonen et al. |
| 2016/0257047 | A1 | 9/2016 | Maruyama |
| 2016/0311140 | A1 | 10/2016 | Stigsson et al. |
| 2017/0021544 | A1* | 1/2017 | Pollard ................. B29C 45/766 |
| 2018/0009187 | A1* | 1/2018 | Park ..................... A43B 13/184 |
| 2018/0079127 | A1 | 3/2018 | Aoki |
| 2018/0281257 | A1 | 10/2018 | Unkovic et al. |
| 2018/0361635 | A1 | 12/2018 | Montague, II et al. |
| 2018/0361643 | A1 | 12/2018 | Montague, II et al. |
| 2020/0164927 | A1* | 5/2020 | Deachin .................. B60R 13/08 |
| 2021/0170655 | A1* | 6/2021 | Montague, II .......... B29C 45/76 |
| 2021/0308923 | A1* | 10/2021 | Unkovic ............. B29C 45/7626 |

FOREIGN PATENT DOCUMENTS

| | | |
|---|---|---|
| EP | 0233548 A2 | 8/1987 |
| WO | WO-2005052525 A2 | 6/2005 |
| WO | WO-2006007749 A1 | 1/2006 |
| WO | WO-2009129230 A2 | 10/2009 |
| WO | WO-2017/015573 A1 | 1/2017 |

OTHER PUBLICATIONS

Non-Final Office Action, U.S. Appl. No. 15/943,786, dated Mar. 23, 2020.

Sors, "Optimum Temperature for Removal of Injection Mouldings", International Polymer Science and Technology, 22(1):T/78-T/81 (1995).

Straet T et al., "Ultraschallmessungen an Duroplastischen Formmassen // Ultrasonic Measurements on Thermoset Moulding Compounds", Kunststoffe Internati, 95(7):73-77 (2005).

International Search Report and Written Opinion, corresponding International Application No. PCT/US2018/025783, dated Jul. 2, 2018.

International Search Report and Written Opinion, corresponding International Application No. PCT/US2018/036829, dated Aug. 10, 2018.

* cited by examiner

US 11,642,821 B2

EXPANDING CROSSLINKING POLYMER INJECTION MOLDING SYSTEM

CROSS REFERENCE TO RELATED APPLICATIONS

This application is a divisional of U.S. patent application Ser. No. 15/992,855, filed May 30, 2018, entitled "Injection Molding of Crosslinking Polymers Using Strain Data", and claims the benefit of the filing date of U.S. Provisional Patent Application No. 62/523,067, filed Jun. 21, 2017, entitled "Injection Molding of Crosslinking Polymers Using Strain Data." The entire contents of U.S. Provisional Application No. 62/523,067 and U.S. patent application Ser. No. 15/992,855 are hereby incorporated by reference.

FIELD OF THE DISCLOSURE

The present disclosure generally relates to injection molding and, more particularly, to injection molding of expanding crosslinking polymers and using measured strain to control the injection molding of expanding crosslinking polymers.

BACKGROUND

Injection molding is a technology commonly used for high-volume manufacturing of parts constructed from thermoplastic materials. During repetitive injection molding processes, a thermoplastic resin, typically in the form of small pellets or beads, is introduced into an injection molding machine which melts the pellets under heat and pressure. The molten material is then forcefully injected into a mold cavity having a particular desired cavity shape. The injected plastic is held under pressure in the mold cavity and subsequently is cooled and removed as a solidified part having a shape closely resembling the cavity shape of the mold. A single mold may have any number of individual cavities which can be connected to a flow channel by a gate that directs the flow of the molten resin into the cavity.

Expanding crosslinking polymers (e.g., ethylene-vinyl acetate or "EVA") are one class of polymers that are commonly injection molded. A typical injection molding process of expanding crosslinking polymers generally includes four basic operations. First, the plastic is heated in the injection molding machine to allow the plastic to flow under pressure. When injection molding expanding crosslinking polymers, at this step, the polymer is heated to a temperature that is below an activation temperature of the polymer, or the temperature at which expansion and crosslinking within the polymer begins to occur.

Next, the melted plastic is injected into a mold cavity or cavities defined between two mold halves that have been closed. The mold or cavity temperature is set to a value that is high enough to activate a chemical reaction or reactions that cause the polymer to begin expansion and crosslinking. At a third step, the plastic is held under pressure to allow adequate crosslinking and expansion (or blowing) to occur in the cavity or cavities. Last, the mold halves are opened, and the molded article is removed or ejected from the mold, thereby allowing the plastic to expand to a final shape and configuration that is larger than the internal volume of the mold cavity.

In conventional systems, a fixed, predetermined volume of plastic is injected into the mold cavity. This volume only partially fills the cavity. The mold cavity is then heated to cause a chemical reaction, upon which the plastic is then left to expand to fill the mold cavity and crosslink for a specified hold time.

After the part is ejected, it is quickly removed from the mold to a stabilization tunnel where curing occurs. By quickly removing the part from the mold, the part can fully expand, and will not be deformed due to the material being constrained from expanding at areas where the part is still captured in the mold. During the curing phase, the part is allowed to slowly cool to a temperature near room temperature. Excess internal gases will slowly escape from the part.

The time when the plastic is ejected (which is dependent on the calculated hold time) is determined or calculated to provide the injected plastic sufficient time to expand and crosslink (thus being sufficiently hardened) to the desired final shape so the plastic does not deform or become otherwise damaged. However, due to material and machine variances, using a fixed hold time as the determining variable can result in varying internal peak cavity pressures, which can impact crosslinking and expansion while in the mold cavity. Specifically, the chemical reaction that causes the part to expand is less consistent, as evidenced by both delayed and inconsistent pressure-builds in existing systems. In turn, when the part is ejected from the mold and enters a curing stage where the molded parts continue to expand and crosslink until reaching a final form, expansion and crosslinking may occur at varying rates, thus resulting in inconsistently sized parts. Further, the parts may have unsightly blemishes and other undesirable flaws.

For example, a melted plastic may have slightly different material characteristics in subsequent injection cycles, thus if subsequent injection cycles were to depend on prior hold times, the occurrence of part imperfections, faults, and other irregularities may arise. If a part is held in the cavity longer than needed, the overall injection molding cycle is unnecessarily long, thus the injection molding machine consumes excess energy which in turn increases operating costs and adversely impacting production capacity. Further, the molded parts may not experience consistent heat transfer in the mold, which can result in a non-uniform skin layer. The cell structure of the molded part may also be non-uniform, meaning free radical molecules may not be aligned. When these molecules are uniformly distributed, the resulting part has more consistent an stable dimensions and physical properties.

Further, conventional systems typically do not provide uniform heat distribution throughout the plastic during the molding process due to varying mold thicknesses. By unevenly heating the plastic, different regions of the plastic within the mold cavity can expand at different rates, which can result in inconsistent parts having wide tolerances.

Further, the molded parts may be incorrectly dimensioned (meaning, parts may be either too large or too small) and may potentially be too soft or too resilient due to insufficient crosslinking. As a result, the molded part may fail any number of objective tests such as an abrasion test, a compression set test, and/or a dynamic elasticity test where energy loss is measured over a number of closely timed impacts with a controlled load.

Using non-time dependent measured variables to control an injection molding system for expanding crosslinking polymers addresses the problems identified above. However, some direct sensors to measure non-time dependent variables, such as sensors placed within a mold cavity, leave undesirable marks on part surfaces. For example, demand for injection molded parts with high gloss finishes has been increasing, and direct sensors positioned in the mold cavity have a tendency to mar the high gloss finish of the parts, requiring post-molding operations to machine or otherwise mask or remove the marred regions from the parts. As a result, indirect sensors that are not located in the mold cavity are preferable. Additionally, when the molding system is being used to make products for medical applications, contact between a sensor and the thermoplastic material may be prohibited.

SUMMARY

Embodiments within the scope of the present invention are directed to the use of non-time dependent measured variables, as calculated from measured strain, to effectively determine an optimal hold profile of one or more expanding crosslinking polymer parts being formed in a mold cavity. A system and/or approach may first inject molten expanding crosslinking polymer into a mold cavity, then measure strain at a mold cavity or another location within the injection molding system, and then calculate from the measured strain at least one non-time dependent variable during an injection molding cycle. Next, the system and/or method commences a hold profile for the part, and upon completing the hold profile, the part is ejected from the mold cavity, whereby the system and/or method commences a cure profile for the part.

In these examples, the mold cavity is nearly completely filled at an injection stage. A suitable hold profile commences when at least one calculated non-time dependent variable reaches a first threshold value, and continues until the calculated at least one non-time dependent variable(s) reaches a second threshold value. During this period, additional molten expanding crosslinking polymer is restricted from being injected into the mold cavity.

In some examples, the first threshold value is indicative of the mold cavity being substantially full of molten expanding crosslinking polymer. The second threshold value may be indicative of the part being structurally sound, and being ready to be ejected.

In some examples, the calculated variable is a cavity pressure value. In these examples, the first threshold value may be a nominal increase in cavity pressure. The second threshold value may be indicative of a substantially constant cavity pressure value over a specified period of time. Other examples of threshold values with respect to cavity pressure measurements are possible.

In other examples, the calculated variable is a temperature value. In these examples, the first threshold value may be a nominal increase above an initial cavity temperature. The second threshold value may represent a substantially constant cavity temperature value over a specified period of time. Other examples of threshold values with respect to cavity temperature measurements are possible.

In some examples, commencement of the cure profile includes first, calculating from measured strain a different non-time dependent variable. Upon the calculated different non-time dependent variable reaching a third threshold value, the cure profile is ended. In these examples, the third threshold value may be indicative of the part being structurally sound. The calculated different non-time dependent variable comprises a pressure value.

In other examples, commencing the cure profile includes allowing the part to cool for a predetermined amount of time.

In some approaches, an expanding crosslinking polymer injection molding system includes an injection molding machine comprising an injection unit and a mold forming at least one mold cavity, a controller adapted to control operation of the injection molding machine, and one or more sensors coupled to the injection molding machine and the controller. The injection unit is adapted to receive and inject a molten expanding crosslinking plastic material into the at least one mold cavity to form a molded part. At least one of the one or more sensors is adapted to measure strain during the injection mold cycle. The controller is adapted to commence a hold profile for the expanding crosslinking polymer part, and is further adapted to cause the molded part to be ejected from the mold cavity upon completing the hold profile, whereupon a cure profile then commences.

By optimizing the hold profile, consistent parts having minimal defects and variances in size are produced. Calculations of the non-time dependent variable or variables based on strain data can be used as a highly accurate measure of when to make process parameter decisions. Further, due to the consistency in molded parts produced when using the optimized hold profile, the subsequent cure profile may further ensure that molded parts remain consistent and within tight tolerances (e.g., within tolerances of approximately 2 mm).

BRIEF DESCRIPTION OF THE DRAWINGS

The above needs are at least partially met through provision of one, more than one, or any combination of the approaches for injection molding expanding crosslinking polymers described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

An injection molding process for expanding crosslinking polymers is herein described. An example of an expanding crosslinking polymer is EVA, which, when polymerized, includes any number of blowing agents and any number of crosslinking agents which are activated by temperatures. For example, the blowing agents and crosslinking agents may be activated between approximately 160° C. and approximately 190° C., or preferably, between approximately 165° C. and approximately 185° C., and more preferably, between approximately 170° C. and approximately 180° C., which may provide an optimal range for blowing and crosslinking to occur. Other examples are possible.

Figure 1:
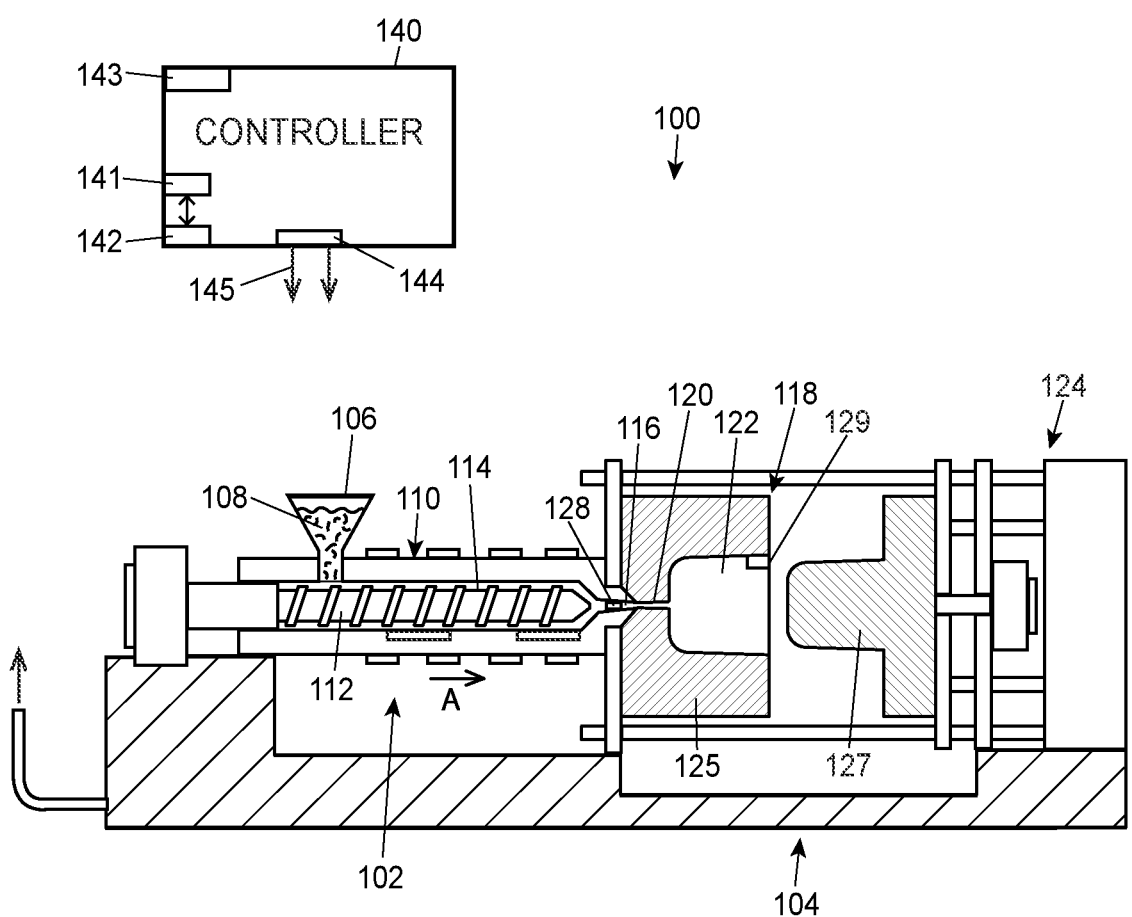
FIG. 1 illustrates an elevation view of an exemplary injection molding machine having two strain gauges and a controller coupled thereto in accordance with various embodiments of the present disclosure.

As illustrated in FIG. 1, an injection molding machine 100 that molds expanding crosslinking polymers includes an injection unit 102 and a clamping system 104. The approaches described herein may be suitable for vertical press injection molding machines and any other known types of injection molding machines. The injection unit 102 includes a hopper 106 adapted to accept the expanding crosslinking polymer material in the form of pellets 108 or any other suitable form. In many of these examples, the pellets 108 include any number of foaming agents, crosslinking agents, and the like. Other examples are possible.

The hopper 106 feeds the pellets 108 into a heated barrel 110 of the injection unit 102. Upon being fed into the heated barrel 110, the pellets 108 may be driven to the end of the heated barrel 110 by a reciprocating screw 112. The heating of the heated barrel 110 and the compression of the pellets 108 by the reciprocating screw 112 causes the pellets 108 to melt, thereby forming a molten plastic material 114. The molten plastic material 114 is typically processed at a temperature selected within a range between about 110° C. and about 150° C. This melt temperature is below an activation of the molten plastic material 114.

The reciprocating screw 112 advances forward and forces the molten plastic material 114 toward a nozzle 116 to form a shot of plastic material 114 which will ultimately be injected into a mold cavity 122 of a mold 118 via one or more gates 120 which direct the flow of the molten plastic material 114 to the mold cavity 122. In other embodiments, the nozzle 116 may be separated from one or more gates 120 by a feed system (not illustrated). The mold cavity 122 is formed between the first and second mold sides 125, 127 of the mold 118 and the first and second mold sides 125, 127 are held together under pressure via a press or clamping unit 124. The mold 118 may include any number of mold cavities 122 to increase overall production rates. The shapes and/or designs of the cavities may be identical, similar, and/or different from each other.

The press or clamping unit 124 applies a predetermined clamping force during the molding process which is greater than the force exerted by the injection pressure acting to separate the two mold halves 125, 127, thereby holding together the first and second mold sides 125, 127 while the molten plastic material 114 is injected into the mold cavity 122. To support these clamping forces, the clamping system 104 may include a mold frame and a mold base, in addition to any other number of components.

The reciprocating screw 112 continues forward movement, causing the shot of molten plastic material 114 to be injected into the mold cavity 122. The mold cavity 122 is heated to a temperature that is higher than the activation temperature of the molten plastic material 114. For example, the mold cavity 122 may be heated to between approximately 160° C. and approximately 185° C., and preferably, between approximately 170° C. and 180° C. As such, a chemical reaction begins to occur within the molten plastic material 114 as it contacts sidewalls of the mold cavity 122. It is understood that walls of the mold cavity 122 may be preheated prior to injection the molten plastic material 114, or alternatively, may be rapidly heated to a suitable temperature as the molten plastic material 114 enters the mold cavity 122. Examples of heating techniques that may be used to heat surfaces of the mold that define the mold cavity are: Resistive heating (or joule heating), conduction, convection, use of heated fluids (e.g., superheated steam or oil in a manifold or jacket, also heat exchangers), radiative heating (such as through the use of infrared radiation from filaments or other emitters), RF heating (or dielectric heating), electromagnetic inductive heating (also referred to herein as induction heating), use of thermoelectric effect (also called the Peltier-Seebeck effect), vibratory heating, acoustic heating, and use of heat pumps, heat pipes, cartridge heaters, or electrical resistance wires, whether or not their use is considered within the scope of any of the above-listed types of heating.

[The injection molding machine 100 also includes a controller 140 which is communicatively coupled with the machine 100 via connection 145, and is generally used to control operation of the injection molding machine 100. The connection 145 may be any type of wired and/or wireless communications protocol adapted to transmit and/or receive electronic signals. In these examples, the controller 140 is in signal communication with at least one sensor, such as, for example, a strain sensor 128 located in the nozzle 116 and/or a strain sensor 129 located on an external surface of mold 118. The strain sensor 129 may be secured directly to an external surface of the mold 118 or may be secured to an external surface of the mold 118 by an assembly. An example of a strain sensor located in a nozzle of an injection molding system is disclosed in U.S. patent application Ser. No. 15/615,996, filed Jun. 7, 2017 and entitled "Upstream Nozzle Sensor for Injection Molding Apparatus and Methods of Use", which is hereby incorporated by reference. An example of a strain sensor secured directly to an external surface of a mold is disclosed in U.S. patent application Ser. No. 15/216,754, filed Jul. 22, 2016 and entitled "Method of Injection Molding using One or More Strain Gauges as a Virtual Sensor," which is hereby incorporated by reference. An example of a strain sensor secured on an external surface of a mold by an assembly is disclosed in U.S. patent application Ser. No. 15/448,992, filed Mar. 3, 2017 and entitled "External Sensor Kit for Injection Molding Apparatus and Methods of Use", which is hereby incorporated by reference.

Returning to FIG. 1, it is understood that any number of additional sensors capable of sensing any number of characteristics of the mold 118 and/or the machine 100 may be placed at desired locations of the machine 100. In particular, a temperature sensor may be placed on the machine 100, and the data obtained from the temperature sensor may be used in conjunction with measured strain from strain sensor 128 or strain sensor 129. Further, although two strain sensors 128 and 129 are depicted in FIG. 1, a single strain sensor or more than two strain sensors may be provided on the machine 100.

The controller 140 can be disposed in a number of positions with respect to the injection molding machine 100. As examples, the controller 140 can be integral with the machine 100, contained in an enclosure that is mounted on the machine, contained in a separate enclosure that is positioned adjacent or proximate to the machine, or can be positioned remote from the machine. In some embodiments, the controller 140 can partially or fully control functions of the machine via wired and/or wired signal communications as known and/or commonly used in the art.

The strain sensor 128 generates a signal which is transmitted to an input of the controller 140. The controller 140 is in communication with a virtual cavity sensor 141, which is implemented as a program, or a set of software instructions. In this disclosure, the term "virtual cavity sensor" refers to a module that can calculate the value of a non-time dependent variable, such as pressure within mold cavity 122, without directly measuring this non-time dependent variable. If the strain sensor 128 is not located within the nozzle 116, the controller 140 can be set, configured, and/or programmed with logic, commands, and/or executable program instructions to provide appropriate correction factors to estimate or calculate values for the measured characteristic in the nozzle 116.

Likewise, the strain sensor 129 generates a signal which is transmitted to an input of the controller 140 and the virtual cavity sensor 141. If the strain sensor 129 is not provided on the mold cavity 122, the controller 140 can be set, configured, and/or programmed with logic, commands, and/or executable program instructions to provide appropriate correction factors to estimate or calculate values for the measured characteristic at the end-of-fill position.

It is understood that any number of additional sensors may be used to sense and/or measure operating parameters including but not limited to strain. For example, U.S. patent application Ser. No. 15/198,556, filed on Jun. 30, 2016 and published as U.S. Publication No. 2017/0001356, describes a sensor positioned prior to the end-of-fill to predict the end-of-fill and is hereby incorporated by reference in its entirety.

The controller 140 is also in signal communication with the screw control 126. In some embodiments, the controller 140 generates a signal which is transmitted from an output of the controller 140 to the screw control 126. The controller 140 can control any number of characteristics of the machine, such as, for example, injection pressures (by controlling the screw control 126 to advance the screw 112 at a rate which maintains a desired melt pressure of the molten plastic material 114 in the nozzle 116), barrel temperatures, clamp closing and/or opening speeds, cooling time, inject forward time, hold profiles, overall cycle time, pressure set points, ejection time, cure profiles, screw recovery speed, and screw velocity. Other examples are possible.

The signal or signals from the controller 140 may generally be used to control operation of the molding process such that variations in material viscosity, mold cavity 122 temperatures, melt temperatures, and other variations influencing filling rate are taken into account by the controller 140. Adjustments may be made by the controller 140 in real time or in near-real time (that is, with a minimal delay between sensors 128, 129 sensing values and changes being made to the process), or corrections can be made in subsequent cycles. Furthermore, several signals derived from any number of individual cycles may be used as a basis for making adjustments to the molding process. The controller 140 may be connected to the sensors 128, 129, the screw control 126, and or any other components in the machine 100 via any type of signal communication known in the art or hereafter developed.

The controller 140 includes virtual cavity sensor 141 adapted to control its operation, any number of hardware elements 142 (such as, for example, a memory module and/or processors), any number of inputs 143, any number of outputs 144, and any number of connections 145. The virtual cavity sensor 141 may be loaded directly onto a memory module of the controller 140 in the form of a non-transitory computer readable medium, or may alternatively be located remotely from the controller 140 and be in communication with the controller 140 via any number of controlling approaches. The virtual cavity sensor 141 includes logic, commands, and/or executable program instructions which may contain logic and/or commands for controlling the injection molding machine 100 according to a mold cycle. The virtual cavity sensor 141 may or may not include an operating system, an operating environment, an application environment, and/or a user interface.

The hardware 142 uses the inputs 143 to receive signals, data, and information from the injection molding machine being controlled by the controller 140. The hardware 142 uses the outputs 144 to send signals, data, and/or other information to the injection molding machine. The connection 145 represents a pathway through which signals, data, and information can be transmitted between the controller 140 and its injection molding machine 100. In various embodiments this pathway may be a physical connection or a non-physical communication link that works analogous to a physical connection, direct or indirect, configured in any way described herein or known in the art. In various embodiments, the controller 140 can be configured in any additional or alternate way known in the art.

The connection 145 represents a pathway through which signals, data, and information can be transmitted between the controller 140 and the injection molding machine 100. In various embodiments, these pathways may be physical connections or non-physical communication links that work analogously to either direct or indirect physical connections configured in any way described herein or known in the art. In various embodiments, the controller 140 can be configured in any additional or alternate way known in the art.

As previously stated, during an injection molding cycle, the strain sensors 128, 129 are adapted to measure strain related to operation of the machine 100. The virtual cavity sensor 141 is configured to calculate from the measured strain at least one non-time dependent variable during the injection mold cycle. Although the arrangement depicted shows two strain sensors 128 and 129 for measuring strain, the virtual cavity sensor 141 can calculate at least one non-time dependent variable based on data from a single strain sensor or from two or more strain sensors. The virtual cavity sensor 141 may calculate the at least one non-time dependent variable using non-strain data as well, such as temperature data provided by a temperature sensor. During operation, the controller 140 commences a hold profile which may be stored in the virtual cavity sensor 141. In some examples, the hold profile may be commenced upon the calculated variable reaching a threshold value. Upon completing the hold profile, the controller 140 will send a signal to the machine that causes the mold cavity 122 to open and to eject the part from the mold 118 so that it can commence the cure profile, where necessary continued expansion and crosslinking occurs to form a structurally sound molded part. For example, a structurally sound molded part may be free of divots, dwells, flash, partial fills, burns, tears, minimal imperfections such as sink marks and/or swirls on the surface layer, weakness at thickness changes, and should have uniformity of mechanical properties.

In these examples, the variable or characteristic may be one other than time (e.g., a cycle, step, or any other time), thus time is not directly measured and used to determine the length of the hold profile, and accordingly, when to eject the part. Rather, the variable or characteristic relies on another value or indicator as a determining factor for part readiness. The use of one or more non-time dependent variables is advantageous because during successive runs, even with the same supply of pellets 108, variations in pellet quality, catalyst stability, ambient conditions, or other factors may influence the cross-linking of the polymer material from shot-to-shot. While a time-dependent process may provide satisfactory parts most of the time, a system that determines ejection readiness based on one or more non-time dependent variables is preferable, as this provides a more accurate assessment for each individual shot or run of the molding system.

Figure 2:
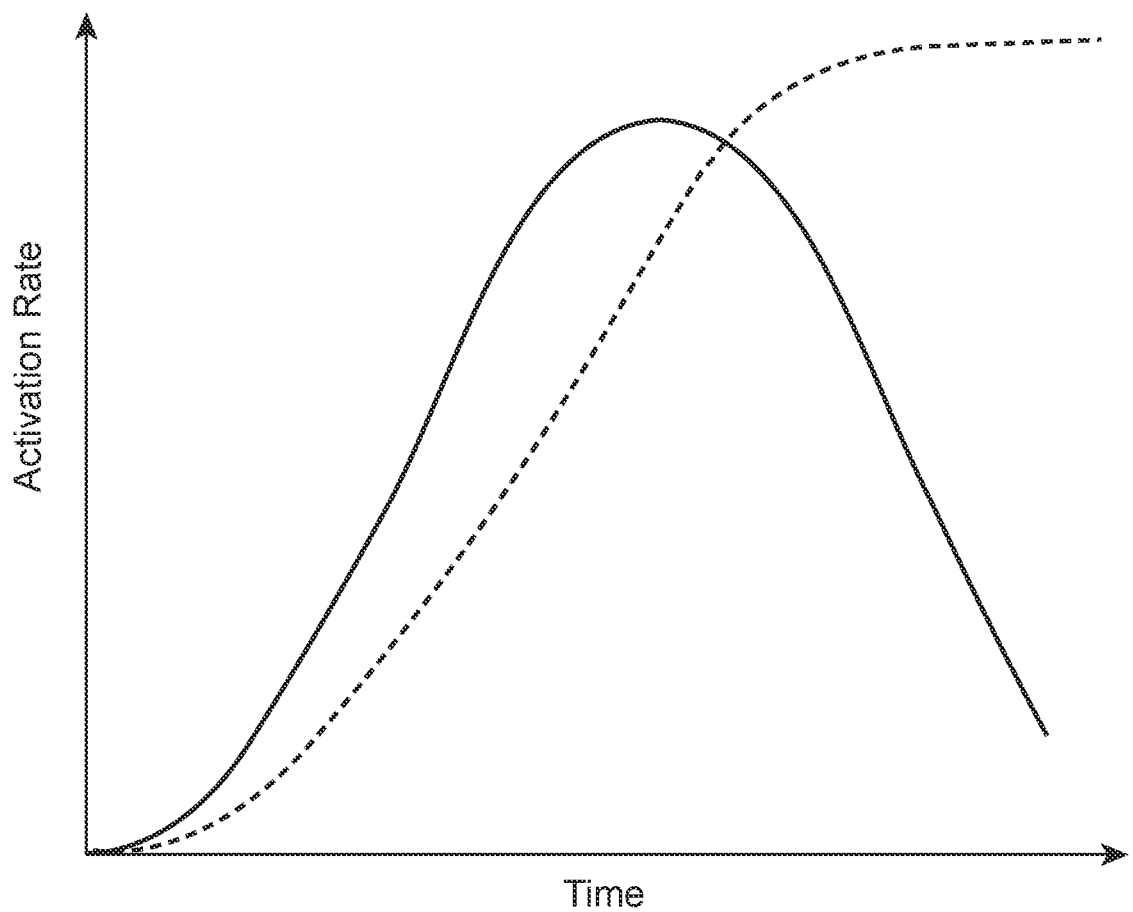
FIG. 2 illustrates an example relationship between a blowing agent and a crosslinking agent over time during injection molding of an expanding crosslinking polymer in accordance with various embodiments of the present disclosure.

Turning to FIG. 2, which illustrates an example relationship between the blowing agent and the crosslinking agent of the expanding crosslinking polymer over time, during the injection molding process, the blowing agent first activates at a given temperature and begins to react over time. Generally speaking, the blowing agent, depicted by the solid line in FIG. 2, will cause the part to expand, thus dictating the part size. At approximately the same point that the blowing agent is activated, the crosslinking agent, depicted by the dashed line in FIG. 2, activates and begins to form structural bonds within the polymer. Both the blowing agent and crosslinking agent generate exothermic reactions, thus they generate heat as the reaction advances, which in turn causes the blowing and crosslinking agents to continue their respective chemical reactions. When the blowing process concludes, the reaction will stop emitting heat. At this point, crosslinking continues until the part is sufficiently formed, meaning the molten plastic material 114 is no longer in a flowable state.

Referring again to FIG. 1, upon the molten plastic material 114 substantially filling the mold cavity 122, a hold profile is commenced. During the hold profile, which may commence upon the calculated variable (which can be calculated by the virtual cavity sensor 141 from strain measured by any of strain sensors 128 and/or 129) reaching a first threshold value, additional molten plastic material 114 is restricted from being injected into the mold cavity 122. This may occur by shutting off the supply of molten plastic material 114, or alternatively, by controlling movement of the screw 112. Additionally, the mold cavity 122 is held closed during the hold profile. Upon the calculated variable (which can be calculated by the virtual cavity sensor 141 from strain measured by any of sensors 128 and/or 129) reaching a second threshold value, controller 140 causes the hold profile to end, whereby the mold cavity 122 is opened and the part is ejected from the mold 118 and the cure profile to commence.

Figure 3:
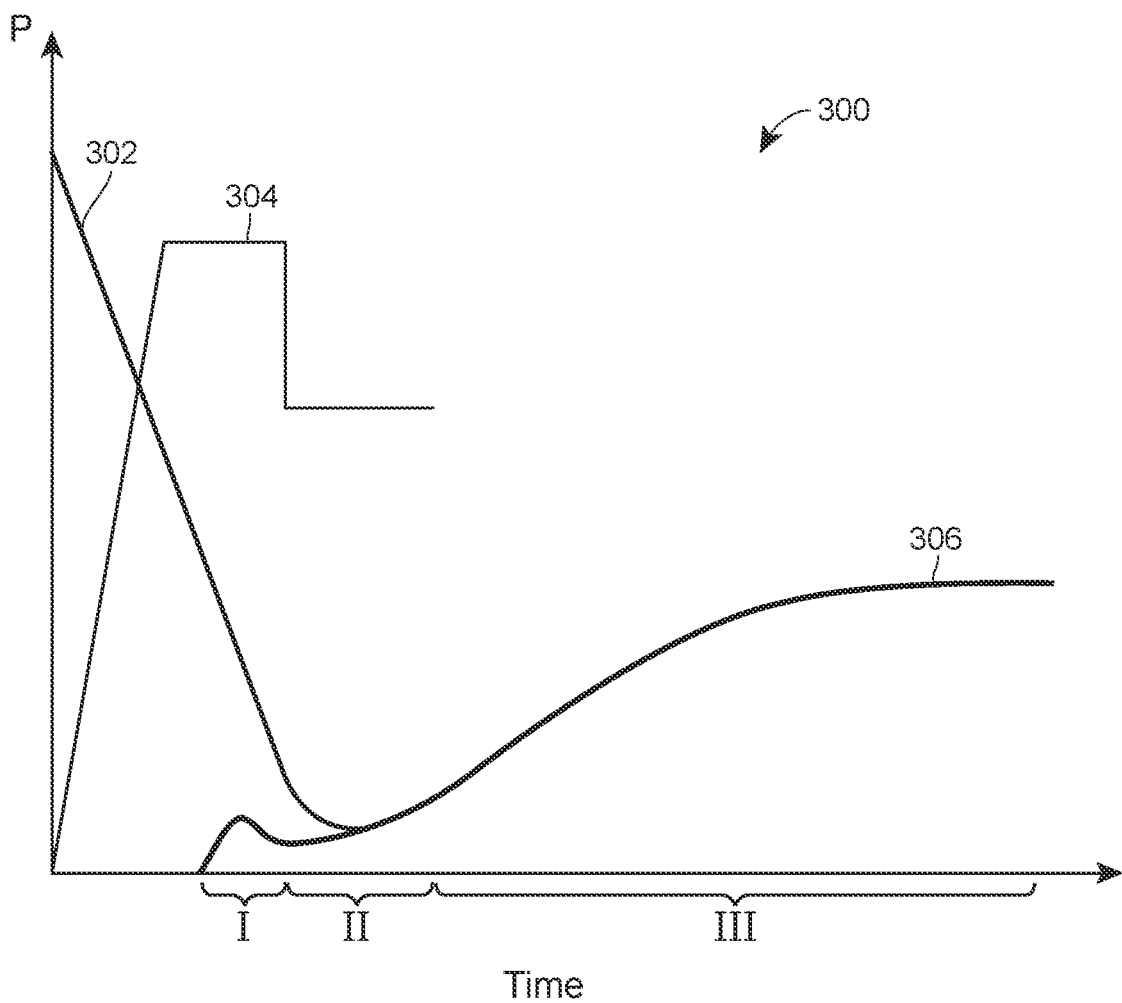
FIG. 3 illustrates an example relationship between screw position, cavity pressure, and melt pressure during an expanding crosslinking polymer injection molding cycle in accordance with various embodiments of the present disclosure.

Turning now to FIG. 3, which represents an example expanding crosslinking polymer injection molding cycle 300, the measured variable may reach first and second threshold values. Line 302 depicts the position of the screw 112 under a certain injection pressure (i.e., 5,000 psi) once the cavity pressure is built to a desired and/or designated trigger point. As an example, the pressure can decrease from approximately 5,000 psi to approximately 2,000 psi at this point. In this example, during injection of the expanding crosslinking polymer, melt pressure, which is depicted by line 304, is first increased and then held to a substantially constant value. Accordingly, the calculated variable (which can be calculated by the virtual cavity sensor 141 from strain measured by any of strain sensors 128 and/or 129) may be a melt pressure. As a non-limiting example, the melt pressure may be between approximately 0 psi and approximately 11,000 psi. Other examples of suitable melt pressures are possible. Further, it is understood that in some examples, the melt pressure may not be held to a substantially constant value.

In FIG. 3, line 306 depicts the calculated variable as a cavity pressure value. In the illustrated example, in region I, the calculated cavity pressure value (which can be calculated by the virtual cavity sensor 141 from strain measured by any of strain sensors 128 and/or 129) exceeds the first threshold value. As previously noted, in some examples, during the injection molding process, the mold cavity 122 can be essentially completely filled with molten plastic material 114.

In this example, the calculated cavity pressure value is defined as a cavity pressure greater than a nominal value, which may be at least partially caused by the molten plastic material 114 completely filling the mold cavity 122 and exerting a pressure on the cavity walls. The increase in cavity pressure may additionally or alternatively be caused by the expansion of the molten plastic material 114 within the mold cavity 122. It is understood that in some examples, the first threshold value may be any desired quantity. For example, the first threshold value may be a distinct cavity pressure value, such as, approximately 100 psi. Other examples are possible.

Upon the virtual cavity sensor 141 calculating a calculated cavity pressure value exceeding the first threshold value, the controller 140 commences the hold profile. As illustrated by line 304 in FIG. 3, the melt pressure is then adjusted (for example, reduced). In the illustrated example, the melt pressure is again held to a substantially constant value, such as, for example, between approximately 500 psi and approximately 3,500 psi. Other examples are possible. This pressure is maintained by controlling movement of the screw 112 to a hold pressure measured at the nozzle by the sensor 128.

At region II, as the melt pressure is maintained, the calculated cavity pressure increases as the molten plastic material 114 begins to blow or expand. Upon the virtual cavity sensor 141 calculating a cavity pressure value that exceeds the second threshold value, the hold profile is completed, and the controller 140 causes the part to be ejected from the mold cavity 122. As an example, the second threshold value may be a distinct cavity pressure value, such as, between approximately 100 psi and approximately 2,000 psi. Other examples are possible. This second threshold value is indicative of the expanding crosslinking polymeric part being sufficiently structurally sound to complete its expansion and crosslinking outside of the mold cavity. At this point, the mold cavity 122 is opened, thus the melt pressure drops to approximately 0.

In some examples, the calculated variable calculated by the virtual cavity sensor 141 from measured strain is a cavity temperature value. Accordingly, in these examples, the first threshold value may be a cavity temperature value that is representative of the mold cavity 122 being substantially completely filled. For example, the first threshold temperature value may be between approximately 168° C. and approximately 176° C. Other examples are possible. Similarly, in these examples, the second threshold value may be a cavity temperature value that is representative of the molten plastic material 114 being sufficiently structurally sound for ejection. In these examples, the cavity temperature may plateau or decrease at a point when the part is ready to be ejected from the mold cavity 122. As a non-limiting example, the second threshold temperature value may be between approximately 1600 C and approximately 1800 C. Other examples are possible.

Because the mold cavity 122 is substantially completely filled (e.g., between approximately 95% and approximately 99% fill) prior to commencement of the hold profile, and because pressure is applied to the molten plastic material 114 thereby holding it against the heated walls of the mold cavity 122, heat is uniformly distributed or transferred to the molten plastic material 114 due to the increased surface contact. Advantageously, the blowing and crosslinking agents will activate more uniformly, thus forming more cohesive bonds.

So configured, the hold profile can be described as the combination of regions I and II in FIG. 3. The injection molding machine 100 does not contemplate the actual duration of time required to commence the hold profile, and rather, the machine 100 operates in a closed loop mold holding pattern. So configured, molded parts have more consistent part sizes and appearances, as well as a uniform skin layer due to consistent heat transfer. Further, not only will particular parts have consistent dimensions, the hold profile helps to ensure reliability and consistency across a range of sizes of parts, which has been particularly challenging with respect to expanding crosslinking polymer articles. Further still, the hold profile provides better control over the process, allowing the part to dictate when the cavity is full and ready to be ejected. In some examples, using the hold profile can decrease the overall cycle time due to a reduced cure time. Additionally, the use of the hold profile can generate parts having more uniformity in cell structure due to free radical molecules becoming aligned. As such, the hold profile makes a more consistent and stable dimensioned part, with consistent physical properties.

At region III, the controller 140 commences a cure profile. As illustrated in FIG. 3, the cavity pressure will ultimately plateau as the part ceases to further expand. Upon the virtual cavity sensor 141 calculating a calculated cavity pressure value that exceeds a third threshold value, the cure profile is completed, and the part is ejected, removed from the cavity 122 or the entire machine 100, and transferred to a stabilization tunnel where curing occurs. As an example, the third threshold value may be a different cavity pressure value, such as, between approximately 2,000 psi and approximately 4,000 psi. Other examples are possible. Alternatively, the third threshold value may be a predetermined rate of change in pressure values, which may indicate that the pressure is no longer increasing. Other examples are possible. This third threshold value is indicative of the expanding crosslinking polymeric part being essentially fully formed and ready for further processing. By using the third threshold value to determine the duration of the cure profile, the machine 100 will not prematurely eject parts that have not fully cured. Additionally, the machine 100 reduces inefficiencies by using unnecessarily long cure times, which can consume unnecessary power and reduce overall yields of the machine.

In some examples, the cure profile may be commenced for a fixed, predetermined time necessary for the part to be fully cured. For example, the cure profile may be programmed to last between approximately 100 seconds and approximately 450 seconds. Other examples are possible. The machine 100 is capable of using a fixed period of time for the cure profile due to the use of the optimized hold profile, which forms consistent parts having uniform characteristics, such as internal crosslinking and bond strength. This uniformity at the onset of the cure profile will result in continued uniformity during the cure profile.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An expanding crosslinking polymer injection molding system comprising:
   an injection molding machine comprising an injection unit and a mold forming a mold cavity, the injection unit adapted to receive and inject a molten expanding crosslinking polymer into the mold cavity to form a molded part;
   a controller adapted to control operation of the injection molding machine; and
   one or more sensors coupled to the injection molding machine and the controller;
   wherein at least one of the one or more sensors is adapted to measure strain during an injection mold cycle,
   wherein the controller is adapted to
      calculate from measured strain at least one non-time dependent variable during the injection mold cycle,
      upon a calculated at least one non-time dependent variable reaching a first threshold value, commence a hold profile for the molded part,
      upon the calculated at least one non-time dependent variable reaching a second threshold value, terminate the hold profile,
      and is further adapted to cause the molded part to be ejected from the mold cavity upon completing the hold profile and commence a cure profile for the molded part,
   wherein the first threshold value is indicative of the mold cavity being substantially full of molten expanding crosslinking polymer.

2. The system of claim 1, wherein the calculated at least one non-time dependent variable comprises a cavity pressure value.

3. The system of claim 1, wherein the hold profile commences at a substantially constant pressure.

4. The system of claim 1, wherein commencing the cure profile comprises:
   calculating a different non-time dependent variable; and
   upon the different non-time dependent variable reaching a third threshold value, terminating the cure profile.

5. The system of claim 4, wherein the different non-time dependent variable comprises a pressure value.

6. The system of claim 1, wherein commencing the cure profile comprises allowing the molded part to cool for a predetermined amount of time.

\* \* \* \* \*